July 17, 1956  A. P. DOUGLAS ET AL  2,755,095
AIRPLANE SIMULATING JUVENILE VEHICLE
Filed April 14, 1954  4 Sheets-Sheet 1

INVENTORS,
ALVIN P. DOUGLAS
GILBERT B. HAHN
BY
Golrick & Golrick
ATTORNEYS

July 17, 1956  A. P. DOUGLAS ET AL  2,755,095
AIRPLANE SIMULATING JUVENILE VEHICLE
Filed April 14, 1954  4 Sheets-Sheet 3

INVENTORS,
ALVIN P. DOUGLAS
BY GILBERT B. HAHN

*Golrick & Golrick*

ATTORNEYS

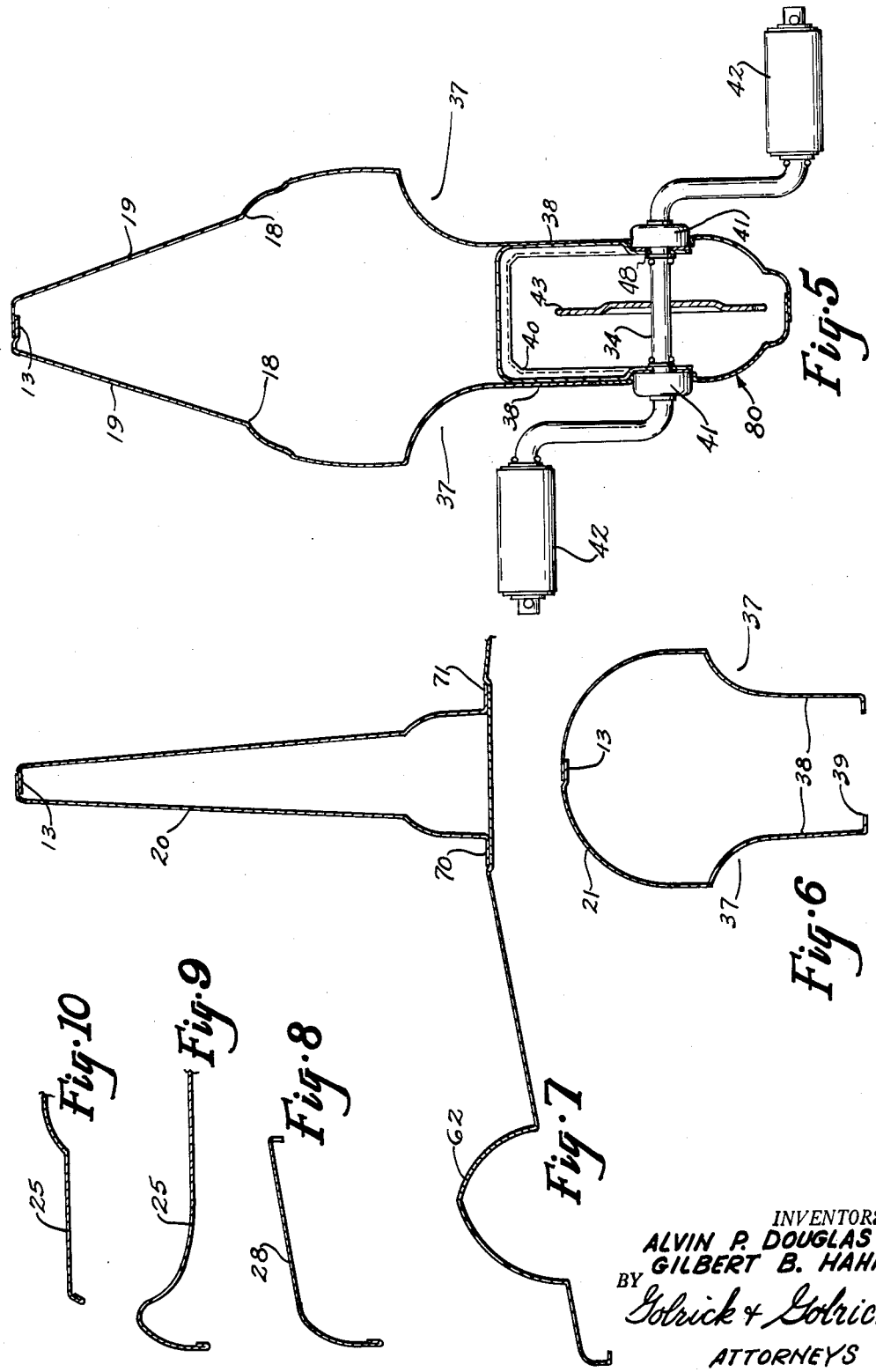

United States Patent Office 2,755,095
Patented July 17, 1956

2,755,095

AIRPLANE SIMULATING JUVENILE VEHICLE

Alvin P. Douglas, Cleveland Heights, and Gilbert B. Hahn, Lyndhurst, Ohio, assignors to The Murray Ohio Manufacturing Company, Cleveland, Ohio, a corporation of Ohio Application April 14, 1954, Serial No. 423,146

11 Claims. (Cl. 280—1.12)

This invention is directed to the provision in juvenile vehicles of a body structure in simulation of a modern high speed plane such as a jet plane and the general purpose thereof is to devise such a fuselage structure of sufficient sturdiness that the child may sit astride the top of the vehicle and propel the same.

A more specific object is the provision of a hollow fuselage or body comprising two drawn sheet metal members complementary in shape and drawn to form a nose structure, a cowl structure and a vertical fin structure secured together along the marginal edges thereof thus to produce a body which will simulate the appearance of a jet plane while serving as the sole load supporting beam from front to rear of the vehicle.

A further object of the present invention is the provision of novel arrangements and mountings of the wheels of the vehicle that will conform in general arrangement to the appearance of a jet plane and wherein the wing construction may serve as a connecting means between the vehicle rear axle and the tail fin structure of the fuselage.

A further object is to so construct the fuselage, while not sacrificing the desired appearance, that the vehicle may be crank driven by the child while sitting astride the top of the fuselage, the arrangement being such that the side walls of the fuselage structure will not interfere with the pedal operation which can be effected in close proximity to the side walls of the fuselage structure.

A still further operation is the provision of a juvenile vehicle of the character referred to with a tricycle mounting connected to the fuselage in such manner that the vehicle may be packaged and shipped in knocked down condition and readily assembled by the merchant.

Other objects of the invention will become apparent from the following description of the characteristics thereof as shown in the drawings and the essential features are set forth in the appended claims.

In the drawings:

Fig. 5 is a transverse cross sectional view taken along the line 5—5 of Fig. 1;

Fig. 6 is a transverse cross sectional view taken along the plane indicated by the line 6—6 in Fig. 6 in the middle region of the fuselage construction;

Fig. 7 is a transverse cross sectional elevation taken through the rear structure of the vehicle as indicated by the line 7—7 of Fig. 1;

Figs. 8, 9 and 10 are transverse cross sectional views taken through the seat structure and dummy elevators as indicated in Fig. 1;

Figure 1:
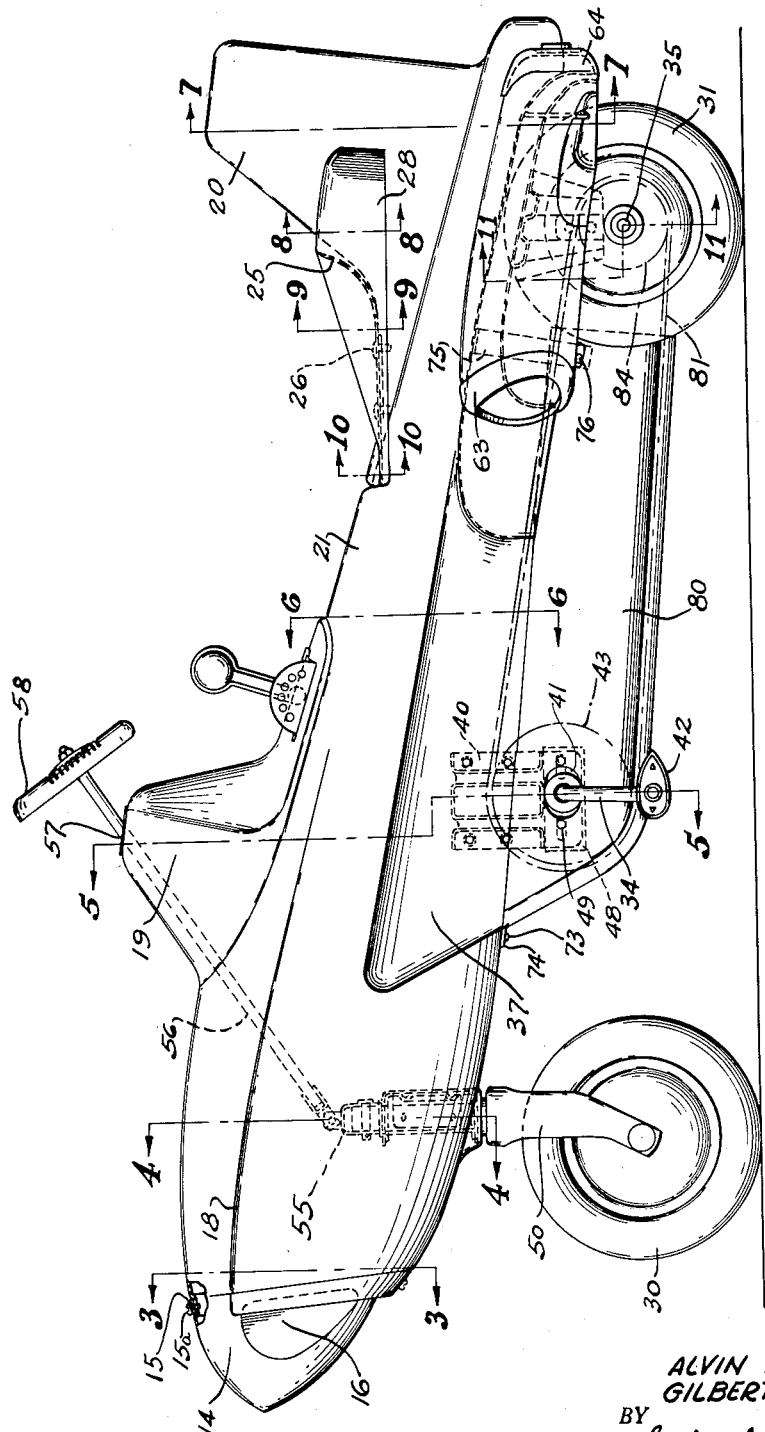
Fig. 1 is a side elevation of a simulated delta jet plane in the juvenile class of vehicles.

The present invention contemplates the derivation of a juvenile vehicle of relatively light weight while being contoured or designed in simulation of a delta type jet plane. The vehicle comprises two relatively thin sheet metal drawn members identical in cross section but relatively reverse in formation to simulate the hollow fuselage of a plane with transverse structures comprising a steering wheel bearing bracket, a pedal hanger bearing bracket and a delta wing formation supporting the rear end of the fuselage and serving as an axle support which carries a pair of rear wheels. The under carriage is such as to constitute a tricycle mounting for the fuselage so that a child may ride upon the top of the fuselage structure while propelling the vehicle. The contour of the two fuselage members is drawn to such shape that when they are joined together along the marginal draw edges thereof by a longitudinal lap seam or joint the forward parts thereof present the appearance of the nose section of a fuselage while the central section presents the appearance of a cowl and cockpit while the rear section presents the appearance of a vertical tail fin thus forming a hollow beam structure from front to back. The two members extend substantially the entire length of the vehicle terminating just short of the front structure which comprises a drawn sheet metal member in simulation of the air intakes of two jet engines. The manner of connecting this front structure hereinafter will be described.

Referring to the drawings the two main body members, as viewed from the front of the vehicle, are designated by the reference numerals 12L and 12R. These main body members are connected by a centrally located lap seam structure 13 (see Figs. 2, 3, 4, 5, 6 and 7) along the entire top reach thereof and along the forward under side of the nose portion thereof. This lap seam structure comprises drawn marginal portions of the two shaped members 12L and 12R formed to overlap and telescope together whereby a spotweld joint may be effected between the two members throughout the various formations thereof along the top of the body and along the forward under part thereof (note section Fig. 3) from the front edges of the members rearwardly to the location of the steering wheel mounting shown in Figs. 1 and 4. The front ends of the two main body members 12L and 12R are closed by a sheet metal drawn shaped member 14 having a slip on joint connection 15 encompassing the forward ends of the main body members. Screw members 15a serve to hold the front piece in removable engagement with the front ends of the members 12L and 12R. This front piece 14 is shaped to have simulated air intakes 16 which match in outline bulging formations 17 defined by depressed ribs 18 formed in the upper side portions of the main body members and which converge rearwardly to a location beneath the integral cowl structure 19 as indicated by the cross-section shown in Fig. 5.

It will be noted in Figs. 1 and 5 that the cowl formation extends upwardly substantially above the forward or nose structure of the body structure and the main body members 12L and 12R converge toward the rear while sloping downwardly and have an integral vertically extending tail formation 20 formed at the rear ends thereof. The intermediate integral section 21 extending between the cowl structure 19 and the tail structure 20 has the top portion rounded as shown by the cross-section in Fig. 6. The under side of the rear tail formations of the members 12L and 12R are shaped to conform to a wing structure and rest thereupon as will be described.

Figure 2:
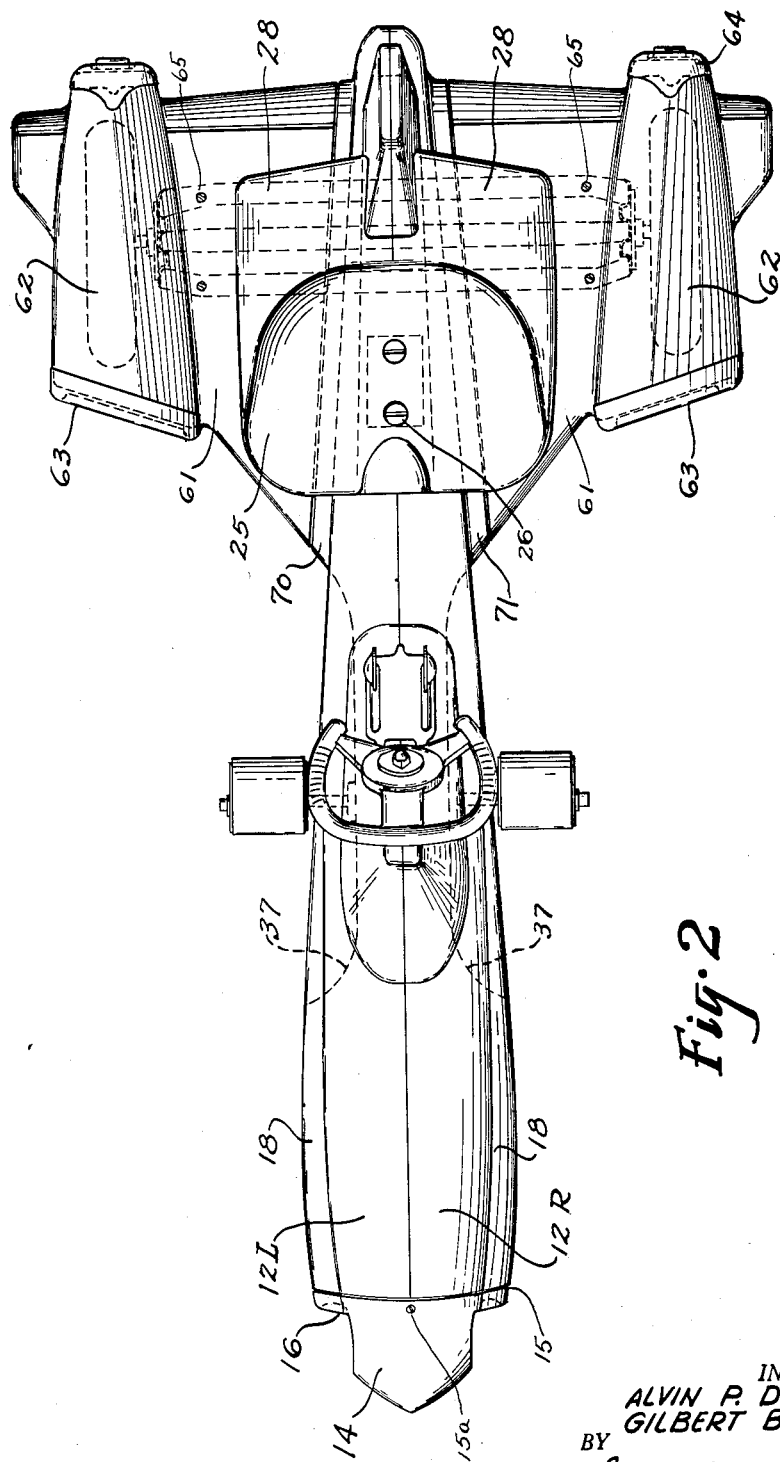
Fig. 2 is a plan view of the vehicle.
Figure 3:
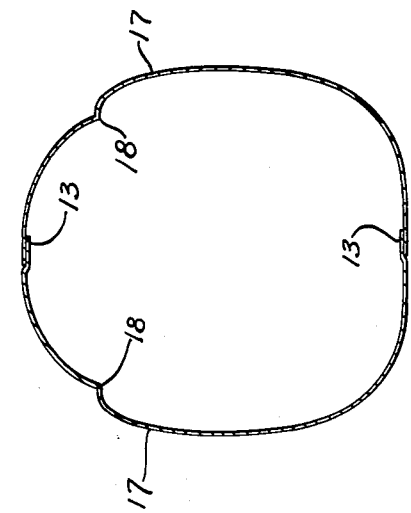
Fig. 3 is a transverse cross sectional elevation taken through the forward end or nose of the fuselage of the vehicle and indicated by the line 3—3 in Fig. 1.

Surmounting the bridging section 21 of the members 12L and 12R extending between the cowl formation 19 and the vertical tail formation 20 is an attached seat structure comprising a single drawn sheet metal member 25 secured to the fuselage or body structure in any suitable manner such as flat head bolts 26. This seat structure has rearwardly extending portions 28 in simulation of elevators formed to embrace the tail structure 20. The cross-sections shown in Figs. 8, 9 and 10 when considered with the seat structure showings in Figs. 1 and 2 illustrate the seat and elevator structures in detail.

As illustrated the described fuselage is provided with a tricycle mounting comprising a fork mounted front dirigible wheel 30 and a pair of rear wheels 31 and a sprocket crank and chain drive connection between a crank hanger 34 and rear axle 35. As viewed in Figs. 1 and 2 it will be noted that the body members 12L and 12R have inset or depressed formations 37 extending from forwardly of the crank hanger 34 rearwardly to the jointure region of the wing construction which is of the delta shape or type. As shown by the cross-section in Fig. 6 this formation provides two vertical wall portions 38 terminating at the bottoms in inwardly turned flanges 39. These vertical walls afford attachment for a bearing bracket 40 carrying bearing structures 41 which support the crank hanger 34 and the bracket is U-shaped to constitute a lateral connecting brace between the body members 12L and 12R as shown in Fig. 5. The flanges 39 are cut out to accommodate bracket 40. In Fig. 5 it will be noted the clearance 37 afforded a child's feet when operating the pedals 42.

The lower flattened ends of the bracket legs may each be provided with a crank slot extending parallel to the length of the chain and also opening through the bracket bottom edge, and each crank bearing may be mounted on a base plate 48 apertured for a pair of fastening bolts 49 passed through corresponding bolt slots in the underlying flat end of the bracket whereby longitudinal adjustment of the crank sprocket 43 may be attained before the chain guard or cover 80 is installed.

Figure 4:
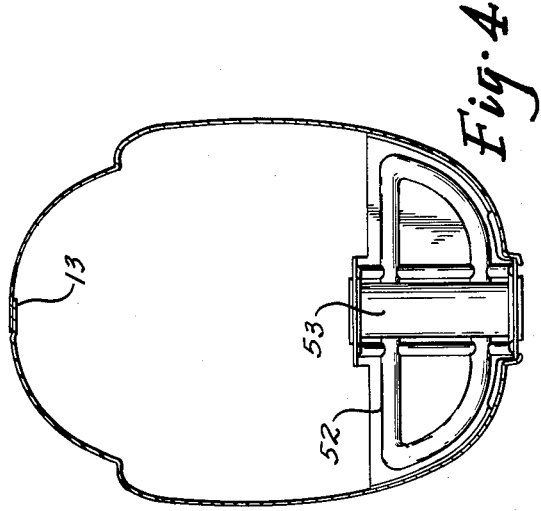
Fig. 4 is a transverse cross sectional view taken through the center of a wheel supporting fork and its bearing support and corresponding to the sectional line 4—4 of Fig. 1.

The mounting for the fork 50 of the front dirigible wheel 30 may also constitute a lateral fuselage brace and may comprise a fork tube bearing bracket 52 conforming in contour to the inside wall shape of the forward part of the fuselage structure as shown in Fig. 4. The central part of this bracket is shaped to support a fork tube bearing structure 53 through which the tube of the fork 50 extends upwardly to a universal joint mechanism shown at 55 in Fig. 1. A steering rod 56 extends at an angle rearwardly through an opening at 57 in the top of the cowl structure 19 whereby the steering arm 58 will be disposed forwardly of the driver's seat.

As stated the fuselage comprising the body members 12L and 12R have the under sides of the rear portions thereof shaped to fit upon a delta wing formation and the delta wing formation constitutes a connection between the rear axle 35 and the fuselage structure. To this end a detachable rear axle bearing supporting bracket 60 is provided of a bail shape to reinforce transversely the wing structure 61 (note Fig. 11). The axle bracket is attachably secured to the under side of the wing structure by screw members 65. The wing structure comprises a single drawn sheet metal member having relatively deep drawn marginal flanges with side formations 62 simulating wing jet engines (note Figs. 1 and 2). The front ends of these formations are closed by drawn cap members 63 which simulate air intakes and the rear ends of the formations are closed by tail caps 64. It will be noted in Fig. 11 that the rear wheels 31 are each disposed within the under open side of the described tail structure.

Figure 11:
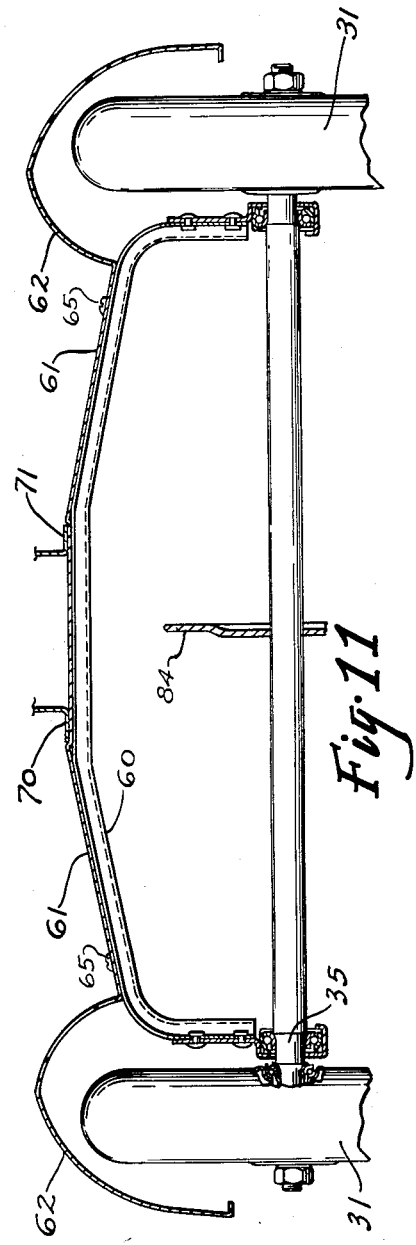
Fig. 11 is a transverse cross sectional view taken vertically along the line 11—11 of Fig. 1 and passing through the center of the rear wheel construction.

As shown in Figs. 1, 7 and 11 the body members 12L and 12R have outwardly extending flanges 70 and 71 respectively which are contoured to follow and fit the drawn shape of the wing structure and the central panel region is depressed the thickness of the fuselage flanges 70—71 whereby appearance is enhanced and facility of welding is obtained.

A chain guard structure 80 comprising two right and left shaped drawn members are shaped to bear against the bottom flanges 39 of the fuselage structure and may be held in place at the forward end by bolts or screws 73 extending through a forwardly extending flange 74 and the fuselage flanges 39 and at the rear by a depending bracket 75 secured to the under side of the wing structure. A single removable bolt 76, extending through the legs of the bracket 75 and both walls of the cover structure 80, the latter having slotted bolt apertures, facilitates positioning and assembly of the cover 80 to the vehicle. Thus the crank sprocket 43 and the chain 81 are shielded from the operator's feet when operating the pedals 42 and the rear sprocket 84 is shielded by the wing structure. The crank bearing apertures in the cover members are elongated to accommodate the pedal crank structure at the various locations selected therefor in adjusting sprocket chain tension and position of sprocket 43.

From the foregoing description of our fuselage structure it will be apparent that the desired juvenile appeal is obtained by constructing the fuselage mainly of two drawn sheet metal members contoured to portray a delta type jet plane which are strengthened by cross bracing structures respectively serving the purpose of mounting a front fork supported dirigible wheel, a crank hanger chain drive and a delta wing formation constituting the structural connection between rear wheel axle and fuselage members.

The two contoured body members 12L and 12R when joined together by the welded longitudinal seams 13 form a sturdy, rigid hollow beam structure when formed of relatively light weight gauge drawn sheet metal. When this beam structure is laterally braced by the steering fork bracket 52, the hanger bracket 40 and the wing structure 61 a rugged fuselage susceptible of considerable rough usage and upon which the juvenile operator can ride, is afforded. It should be noted that this beam strength also is obtained in the central longitudinal region of the fuselage where the bottom regions of the side walls are indented or laterally converged to afford pedal operation clearance.

It will also be noted that the arrangement of the undergear is such that the vehicle can be boxed for shipping in a minimum sized carton by disassemblying the front fork, the steering rod 56 and steering arm or wheel 58. For the stated purpose the pedals 42 are detached from the crank hanger and the rear wheels from the axle. The chain guard or housing 80 is also shipped detached and the rear axle bail 60 may be detached and positioned with the chain remaining loose between the crank hanger 34 and the rear axle. Upon reaching the retail source, the merchant has access through the front end of the fuselage to connect the steering fork tube by removing cap 14 to the steering rod 56 to the universal point means 55. The rear axle bracket 60 with the chain positioned upon the respective sprockets is then attached to the underside of the wing structure as described. The chain housing, front piece and pedals are then attached in an obvious manner.

If desired various accessories may be attached to the vehicle such as the dummy controls shown at C in Figs. 1 and 2, lights, etc. none of which is involved in fulfilling the objects of the present invention.

To those skilled in the art it will be apparent that the delta wing formation may be made in two halves which may be bolted or welded to the lower parts of the side walls of the vertical tail formation with these serving as a lateral reinforcing member or other forms of axle brackets attached to the wing structure could be used.

To the specific ornamental design of the vehicle shown in the drawings, which is the object of a design patent application about to be filed in the name of Viktor Schreckengost, we assert no claim.

We claim:

1. In a juvenile vehicle two piece fuselage construction comprising two reversely complementary drawings of sheet metal joined at the longitudinal center of the structure along the marginal portions of the sheet metal drawings, each of the sheet metal drawn parts having integral formations depressed from the plane of the sheet metal blank in simulation of a forward fuselage portion and a vertical tail formation with a seat supporting section located intermediate said forward fuselage portion and the tail formation, a wing deck structure, said tail formation resting on the wing deck structure and the wing structure extending laterally at each bottom side of the fuselage structure.

2. A fuselage construction for a juvenile vehicle comprising sheet metal members drawn shaped to be right and left hand complements of each other and joined along longitudinal margins thereof to form a two piece hollow body, said members being formed to constitute an open nose structure and a rearwardly disposed cowl structure and said members being draw formed to provide a hollow cowl structure vertically extending above the nose structure and an enclosed nose structure, a removable nose cap closing said nose structure, a steering wheel fork supported within the nose structure with the fork structure extending upwardly inside of the nose structure, a steering rod passing through the top region of the cowl structure and operatively connected to the top of the fork structure within the nose structure by a universal joint and said joint being accessible for connection through said nose structure when the nose cap is removed.

3. In a juvenile vehicle a two piece drawn sheet metal structure having the pieces drawn in simulation of a jet plane fuselage, a vertical tail fin structure formed of integral parts of said sheet metal members, a wing structure attached to the fin structure of said members, and a seat structure mounted upon the top of the fuselage, said seat structure having simulated elevators embracing the vertical tail structure.

4. In a juvenile vehicle constructed to simulate the appearance of a jet plane, a body or fuselage formed of two drawn sheet metal members having nose, cowl and vertical tail portions which are formed to be of hollow construction by having the drawn sheet metal members secured together along a seam connection of the marginal portions of said members extending longitudinally of the fuselage structure thereby to form a relatively lightweight hollow body enclosed at the top thereof, said joined members having longitudinally extending indentations formed in the lower regions of the body side walls thereof and located below the cowl structure to afford foot and pedal clearances, and a crank hanger bracket disposed within the hollow body transversely connecting said lower indented portions of the side walls of the body.

5. In a juvenile vehicle of the propelled type constructed to simulate in appearance a jet plane, a fuselage constructed comprising two formed sheet metal members right and left hand complements of each other and joined longitudinally along the trim regions thereof, wheel mountings for the fuselage, the shape of the fuselage being such as to slope from front to rear and supported at the rear by a wing formation, said wing formation being attached to the fuselage, an axle supporting bracket attached to the wing formation, an axle supported by the brackets and traction wheels on the axle within the wing structure.

6. In a juvenile vehicle of the propelled type constructed to simulate in appearance a jet plane, a fuselage construction comprising two sheet metal formed members right and left hand in disposition and joined longitudinally along the trim regions thereof, a delta wing construction, front and rear wheel mountings within the construction, the shape of the fuselage being such as to slope from front to rear to be supported at the rear by said delta wing construction, said delta wing construction being attached to the fuselage, near traction wheels, an axle supporting bracket attached to the under side of the wing construction, and an axle on the bracket on which the wheels are mounted within the wing construction.

7. In a juvenile vehicle a two piece sheet metal structure having the pieces drawn in simulation of a jet plane fuselage when assembled together, a tail fin structure formed of integral parts of said sheet metal members, a hollow wing structure attached to the tail fin structure of said members, a front steering wheel, a steering fork for the wheel, a bearing bracket interiorly disposed to connect the forward portions of the drawn metal members while supporting the fork and a pair of traction wheels supported within and by the wing structure.

8. In a juvenile vehicle constructed to simulate the appearance of a jet plane, a body or fuselage formed of two drawn sheet metal members having nose and vertical tail portions which are formed to be of hollow construction by having the drawn sheet metal members secured together along a seam connection of the marginal portions of said members extending longitudinally of the fuselage structure, a single piece nose member embracing and spanning the seam joining said members, a seat structure formed to span said seam forwardly of the tail structure and intermediate the ends of said sheet metal members, a steering fork bracket connecting the interior lower region of said sheet metal members and a second bracket disposed within and connecting the lower intermediate portions of said sheet metal members, said second bracket structure also serving as a crank hanger bearing support.

9. A juvenile vehicle body comprising two drawn sheet metal members of complementary shape and joined together along the sheared marginal edges thereof to form a hollow body with a continuous seam connection from front to back along the top of the body, a steering wheel mounting attached interiorly to the forward portion of said members, a sprocket driving pedal hanger mechanism disposed rearwardly of the steering wheel mounting, a seat structure straddling the top of said drawn sheet metal members and a rear structure supporting the rear portions of said drawn sheet metal members and constituting wheel mountings for rear traction wheels.

10. A juvenile vehicle body constructed in simulation of an open cockpit delta jet plane comprising two longitudinally extending sheet metal drawn members joined to form a hollow fuselage closed by a seam at the top and open at the bottom, a bracket constituting a cross brace at the forward part of the bottom opening and serving as a steering fork bearing, a bracket located in the central region of the bottom opening constituting a cross brace for said two drawn members and a wing formation serving to connect the two members thereby to close said bottom opening at the rear section of said members.

11. In a juvenile vehicle, a hollow body structure enclosed at the top and open at the bottom in the central region thereof and comprising downwardly extending side walls horizontally spaced apart to receive a chain sprocket, a hanger supporting bracket transversely connecting the lower regions of said walls, crank hanger bearing brackets associated with the hanger supporting bracket and longitudinally adjustable relative to the hanger supporting bracket and a crank hanger supported by said bearing brackets and extending through the side walls with the cranks externally disposed for pedal operation.

References Cited in the file of this patent

UNITED STATES PATENTS

| D. 88,687 | Swartz | Dec. 13, 1932 |
| D. 152,632 | Masten | Feb. 8, 1949 |

(Other references on following page)

UNITED STATES PATENTS

| | | |
|---|---|---|
| 1,297,856 | Jacob | Mar. 18, 1919 |
| 1,567,144 | Heck | Dec. 29, 1925 |
| 1,585,164 | Moebs | May 18, 1926 |
| 1,599,693 | Ulatowski | Sept. 14, 1926 |
| 1,754,430 | Kraeft | Apr. 15, 1930 |
| 1,783,949 | Berg | Dec. 9, 1930 |

FOREIGN PATENTS

| | | |
|---|---|---|
| 288,439 | Great Britain | Apr. 12, 1928 |

OTHER REFERENCES

Western Flying (Magazine), March 1951; copy in Des. 71–1 front cover of magazine—picture of Douglas XFAD–1 Navy "Skyray."